United States Patent
Shibao

(10) Patent No.: US 10,631,350 B2
(45) Date of Patent: Apr. 21, 2020

(54) COMMUNICATION APPARATUS, METHOD OF CONTROLLING SAME, AND STORAGE MEDIUM

(71) Applicant: CANON KABUSHIKI KAISHA, Tokyo (JP)

(72) Inventor: Mayumi Shibao, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/185,340

(22) Filed: Nov. 9, 2018

(65) Prior Publication Data
US 2019/0166637 A1   May 30, 2019

(30) Foreign Application Priority Data
Nov. 24, 2017   (JP) .................. 2017-226034

(51) Int. Cl.
*H04W 4/00* (2018.01)
*H04W 76/14* (2018.01)
(Continued)

(52) U.S. Cl.
CPC ........ *H04W 76/14* (2018.02); *H04N 1/00408* (2013.01); *H04W 48/16* (2013.01);
(Continued)

(58) Field of Classification Search
CPC ..... H04W 48/12; H04W 48/16; H04W 48/18; H04W 48/20; H04W 8/04; H04W 8/26; H04W 36/08; H04W 36/12; H04W 36/14; H04W 36/18; H04W 36/30; H04W 60/00; H04W 60/04; H04W 88/06
(Continued)

(56) References Cited

U.S. PATENT DOCUMENTS

| | | |
|---|---|---|
| 10,079,955 B2 | 9/2018 | Shibao |
| 2014/0268231 A1* | 9/2014 | Ito .................. G06F 3/1292 358/1.15 |

(Continued)

FOREIGN PATENT DOCUMENTS

JP    2016-146611 A    8/2016

*Primary Examiner* — Temica M Beamer
(74) *Attorney, Agent, or Firm* — Venable LLP

(57) ABSTRACT

A communication apparatus acquires network information for establishing a wireless connection with an external apparatus using a first wireless communication method, based on information captured by an image capturing unit, and acquires information related to the communication apparatus from an operating system running on the communication apparatus and determines whether to change a connection destination of the first wireless communication method. When it is determined to request the operating system to change the connection destination, a change request is transmitted for changing, to a connection destination identified based on the acquired network information, the connection destination to which the communication apparatus performs a wireless connection using the first wireless communication method, and when it is determined not to change the connection destination, a screen is displayed for prompting a user to switch a connection destination with a manual selection and via a setting screen provided by the operating system.

10 Claims, 8 Drawing Sheets

(51) Int. Cl.
*H04W 48/16* (2009.01)
*H04N 1/00* (2006.01)
*H04W 36/00* (2009.01)
*H04W 48/18* (2009.01)

(52) U.S. Cl.
CPC ..... *H04N 2201/0094* (2013.01); *H04W 36/03* (2018.08); *H04W 48/18* (2013.01)

(58) Field of Classification Search
USPC ................ 455/434, 435.1, 435.2, 436, 552.1
See application file for complete search history.

(56) References Cited

U.S. PATENT DOCUMENTS

2017/0102903 A1* 4/2017 Nagasawa ............. G06F 3/1222
2018/0004929 A1 1/2018 Sakai

* cited by examiner

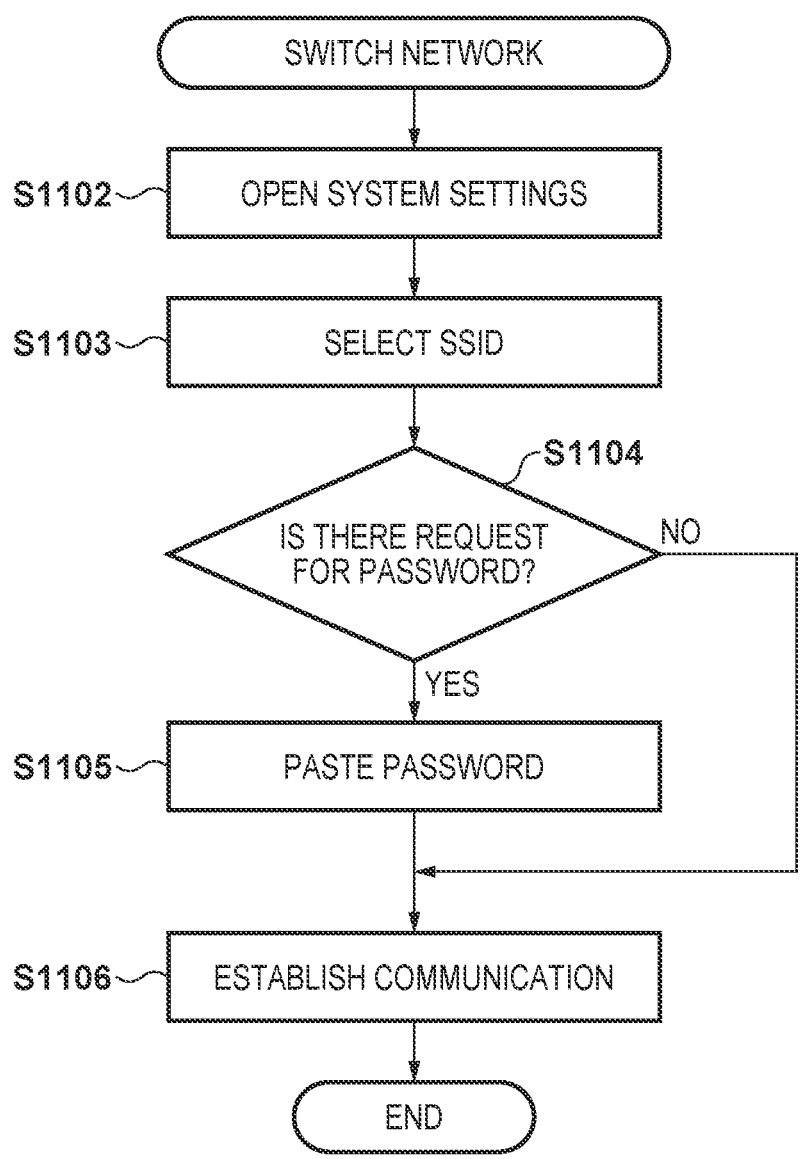

COMMUNICATION APPARATUS, METHOD OF CONTROLLING SAME, AND STORAGE MEDIUM

BACKGROUND OF THE INVENTION

Field of the Invention

The present invention relates to a communication apparatus that can execute wireless communication using a two-dimensional code, a method of controlling the same, and a storage medium.

Description of the Related Art

There is a wireless communication technique where an information device itself becomes a wireless base station, and can make a direct wireless connection with a mobile terminal. Here, the wireless communication between the information device and the mobile terminal requires input of an ID (SSID) and a passkey to make a Wi-Fi (registered trademark) connection, and there are many cases where these differ for each connection. Accordingly, there is a method where the information device displays its own network information by a two-dimensional code, and the mobile terminal captures and recognizes this to set the ID and passkey. However, procedures for establishing wireless communication differ in accordance with the type and state of a connection destination device, and the type and state of the mobile terminal. Accordingly, Japanese Patent Laid-Open No. 2016-146611 proposes a method for, after recognizing a two-dimensional code, identifying the type of a connection destination device, and changing a connection operation.

However, there is a problem as is recited below in the foregoing conventional technique. For example, there are cases where a procedure up until the establishment of wireless communication changes in accordance with the type and state of the mobile terminal. In such a case, there is no problem, even if a two-dimensional code is read to acquire network information, if it possible to use the network information to automatically switch the network. However, if it is not possible to switch the network automatically, a user will be requested to perform a complex operation to switch the network. Accordingly, the user needs knowledge regarding the operation, and there is also the possibility that the complex operation will require effort by the user.

SUMMARY OF THE INVENTION

The present invention enables realization of a mechanism for switching support to a user in accordance with whether it is possible to use acquired network information to automatically make a wireless connection to a network.

One aspect of the present invention provides a communication apparatus, comprising: a memory device that stores a set of instructions; and at least one processor that executes the set of instructions to: acquire network information used when making a wireless connection to a connection destination, from information captured by an image capturing unit; determine whether it is possible to automatically make a wireless connection to the connection destination using the acquired network information; use the acquired network information to automatically make a wireless connection to the connection destination in a case where it is determined that it is possible to automatically make the wireless connection to the connection destination using the acquired network information; and control to display a screen for supporting input of the network information by a user in a case where it is determined that it is not possible to automatically make the wireless connection to the connection destination using the acquired network information.

Another aspect of the present invention provides a method of controlling a communication apparatus, the method comprising: acquiring network information used when making a wireless connection to a connection destination, from information captured by an image capturing unit; determining whether it is possible to automatically make a wireless connection to the connection destination using the acquired network information; using the acquired network information to automatically make a wireless connection to the connection destination in a case where it is determined that it is possible to automatically make the wireless connection to the connection destination using the acquired network information; and controlling to display a screen for supporting input of the network information by a user in a case where it is determined that it is not possible to automatically make the wireless connection to the connection destination using the acquired network information.

Still another aspect of the present invention provides a non-transitory computer readable storage medium storing computer executable instructions for causing a computer to execute a method, the method comprising: acquiring network information used when making a wireless connection to a connection destination, from information captured by an image capturing unit; determining whether it is possible to automatically make a wireless connection to the connection destination using the acquired network information; using the acquired network information to automatically make a wireless connection to the connection destination in a case where it is determined that it is possible to automatically make the wireless connection to the connection destination using the acquired network information; and controlling to display a screen for supporting input of the network information by a user in a case where it is determined that it is not possible to automatically make the wireless connection to the connection destination using the acquired network information.

Further features of the present invention will be apparent from the following description of exemplary embodiments with reference to the attached drawings.

BRIEF DESCRIPTION OF THE DRAWINGS

FIG. 11 is a flowchart for a user to switch Wi-Fi by a mobile terminal, according to an embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<System Configuration>

Description is given below regarding a first embodiment of the present invention, with reference to the attached drawings. Firstly, with reference to FIG. 1, description is given for an example of a system configuration according to the present embodiment. A mobile terminal 101 is a communication apparatus such as a smart phone, a tablet PC, a mobile telephone, a notebook PC, or an information terminal, and can perform various types of wireless communication, such as Wi-Fi, Bluetooth (registered trademark), and telephone communication. An MFP 102 is an image processing apparatus, can perform wired communication and various kinds of wireless communication, and can itself operate as an access point, and make a Wi-Fi Direct connection with the mobile terminal 101, for example. An access point 103 functions as a wireless access point for relaying wireless communication.

Note that, in the following embodiment, description is given for an example where a wireless connection, for example a Wi-Fi Direct connection, is made between the mobile terminal 101 and the MFP 102, but the present invention is not limited to this wireless connection. For example, for the present invention, a wireless connection between the mobile terminal 101 and the MFP 102 may be any kind of wireless communication if it is wireless communication where print data can be transmitted from the mobile terminal 101 to the MFP 102. For example, it may be short-range wireless communication or Bluetooth communication.

Figure 1:
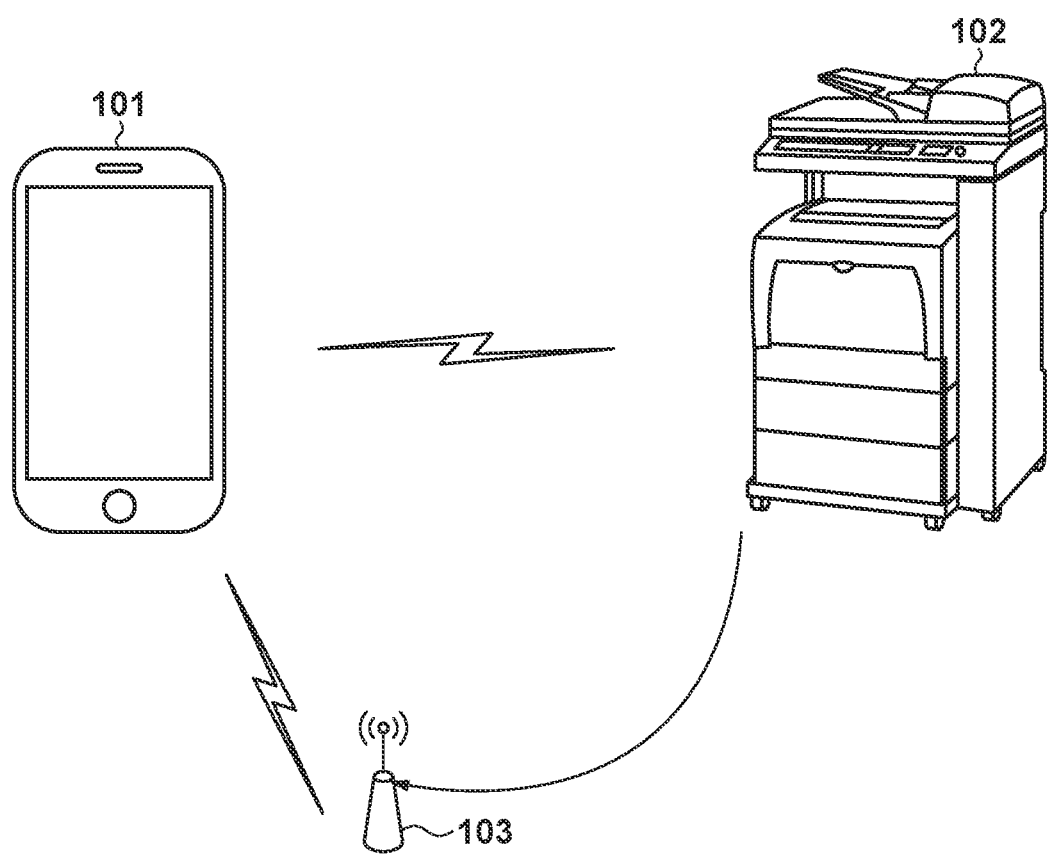
FIG. 1 is a communication conceptual view of a device and a mobile terminal according to an embodiment.

In FIG. 1, the mobile terminal 101, the MFP 102, and the access point 103 can communicate through respectively corresponding communication mediums. Specifically, the mobile terminal 101 can perform wireless communication with the MFP 102 via the access point 103, and can also perform direct wireless communication with the MFP 102. Of course, the configuration illustrated in FIG. 1 merely illustrates an example of a typical configuration. For that reason, the mobile terminal used by a general user may be another information device.

<MFP Configuration>

Figure 2:
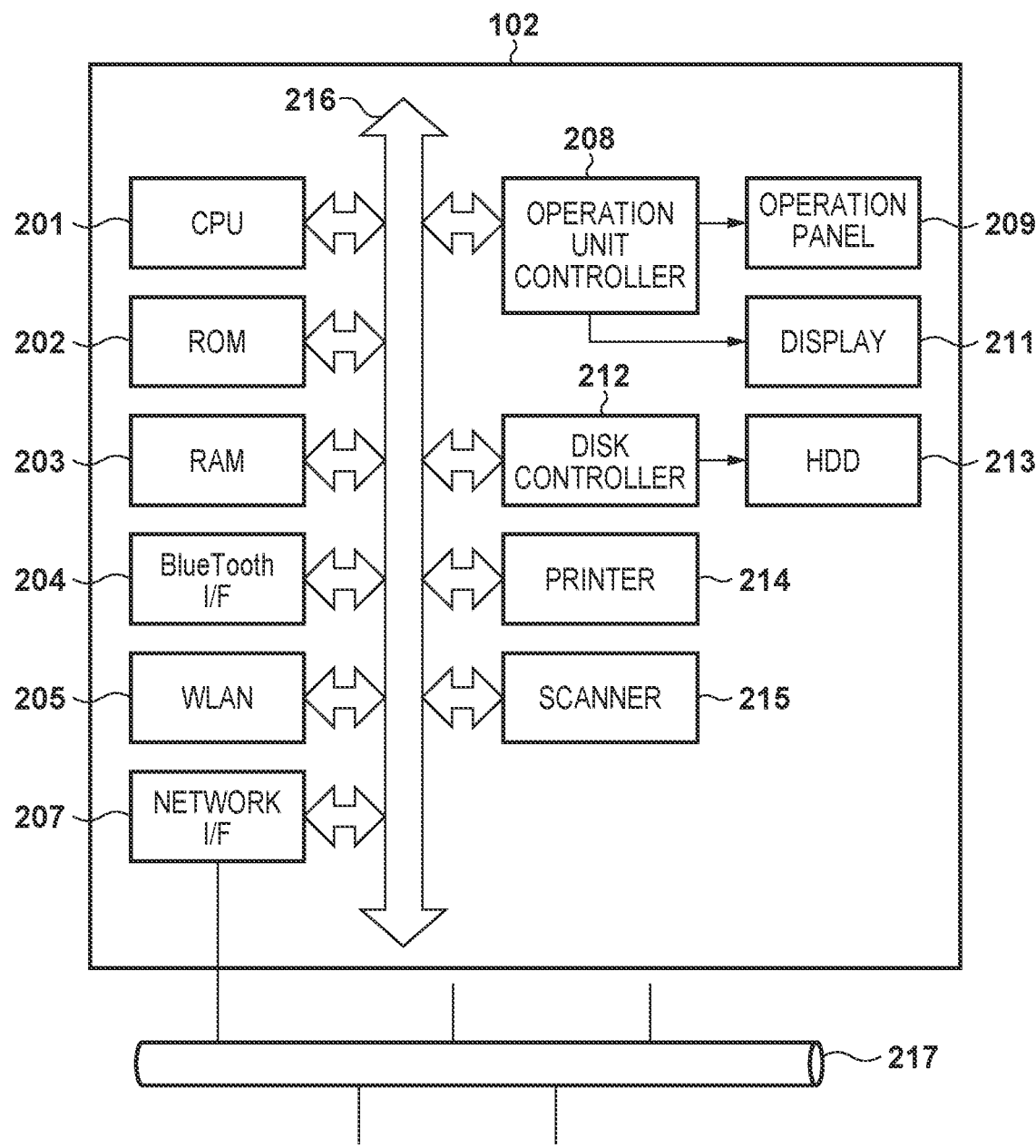
FIG. 2 is an internal configuration diagram of the device according to an embodiment.

Next, with reference to FIG. 2, description is given for an example of the internal configuration of the MFP 102 according to the present embodiment. The MFP 102 is provided with a CPU 201, a ROM 202, a RAM 203, a Bluetooth I/F 204, a WLAN 205, a network I/F 207, an operation unit controller 208, an operation panel 209, a display 211, a disk controller 212, an HDD 213, a printer 214, and a scanner 215.

The CPU 201 executes a control program stored in the ROM 202 or the hard disk 213 to comprehensively control each device connected to a system bus 216. The RAM 203 functions as a main memory, a work area, or the like of the CPU 201. The operation unit controller 208 controls various buttons provided on the MFP 102, the operation panel 209, the display 211, or the like. The disk controller 212 controls the HDD 213.

The network I/F 207 exchanges data bidirectionally with another network device, file server, or the like via a network 217. The WLAN 205 is a wireless communication module, and, when operating in an infrastructure mode, connects to the network 217 via an access point, and exchanges data bidirectionally with another network device, the file server, or the like. When operating in the software AP mode, the MFP 102 operates as an access point, and can make a direct wireless communication connection (for example, Wi-Fi Direct) with a mobile terminal.

The printer 214 is a print unit for printing an image to a sheet by an electro-photographic method. The printing method does not especially need to be the electro-photographic method. The scanner 215 is an image reading unit for reading an image that has been printed on a sheet. In many cases, the scanner 215 is optionally installed with an ADF (automatic document feeder) (not shown), and can automatically read a plurality of originals. Note that the HDD 213 may be used as a temporary storage location for images in some cases. The MFP 102 can exchange data with various types of peripheral devices via the Bluetooth I/F 204. The MFP 102 of the configuration illustrated in FIG. 2 is not limited to the configuration described above, and may be a device that is a stand-alone printer.

<Mobile Terminal Configuration>

Figure 3:
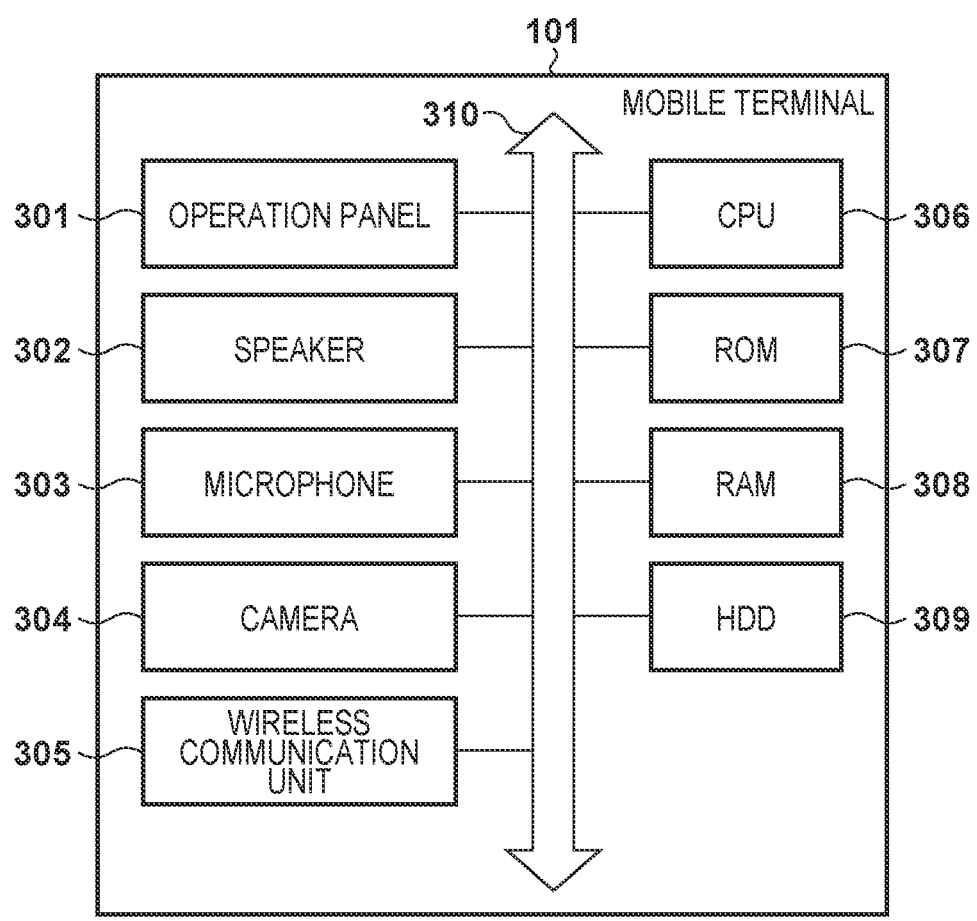
FIG. 3 is an internal configuration diagram of a mobile terminal according to an embodiment.

Next, with reference to FIG. 3, description is given for a hardware configuration of the mobile terminal 101. Note that an apparatus such as a smart phone or a tablet PC as described above is envisioned for the mobile terminal 101 of the present embodiment, but it may be another apparatus if it is an information processing apparatus that can execute capturing of a still image. The mobile terminal 101 is provided with an operation panel 301, a speaker 302, a microphone 303, a camera 304, a wireless communication unit 305, a CPU 306, a ROM 307, a RAM 308, and an HDD 309. Each component can exchange data mutually via a system bus 310.

The CPU 306 reads a control program stored in the ROM 307, and executes various processing for controlling operation of the mobile terminal 101. The ROM 307 stores the control program. The RAM 308 is used as a temporary storage area, such as a main memory or a work area of the CPU 306. The HDD 309 stores various types of data such as a photograph or an electronic document.

The operation panel (a display unit) 301 is provided with a touch panel function that can detect a touch operation by a user, and displays various screens that are provided by an OS (operating system) or a print application. A user can input a desired operation instruction to the mobile terminal 101 by inputting a touch operation to the operation panel 301. Note that the mobile terminal 101 is provided with a hardware key that is not shown, and the user can use this hardware key to input an operation instruction to the mobile terminal 101.

The speaker 302 and the microphone 303 are used when the user makes a call to another mobile terminal, a fixed telephone, or the like. The camera 304 performs capturing in response to a capturing instruction by a user. A photograph captured by the camera 304 is stored in a predetermined area of the HDD 309. The mobile terminal 101 can exchange data with various types of peripheral devices by various kinds of wireless communication via the wireless communication unit 305.

<Screen Examples>

Figure 4:
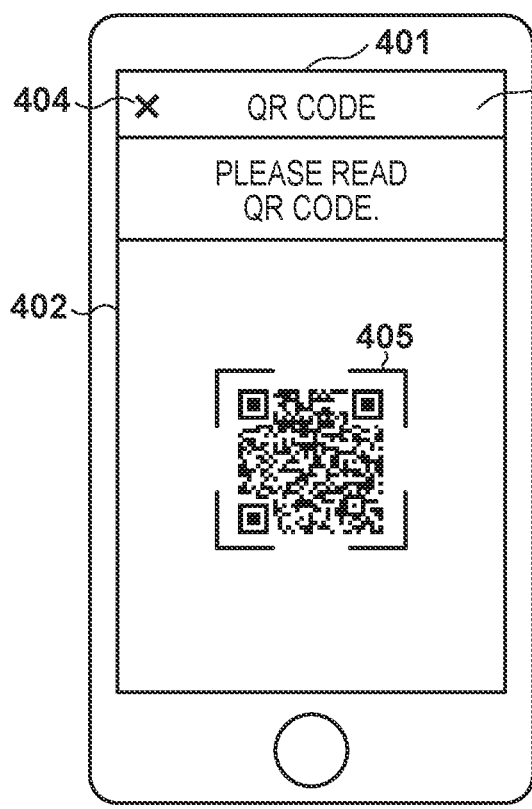
FIG. 4 is a two-dimensional code reading screen of the mobile terminal according to an embodiment.

Next, with reference to FIG. 4 through FIG. 7, description is given for examples of screens of the mobile terminal 101 according to the present embodiment. FIG. 4 is a two-dimensional code reading screen 401 for capturing a two-dimensional code displayed on an operation panel of the MFP 102 by using the camera 304 of the mobile terminal 101. A screen title 403 displays a title ("QR code (registered trademark)") indicating that this is a two-dimensional code reading screen. An image capturing area 402 displays an image captured by the camera 304, and displays a guide frame 405 for increasing reading accuracy of the two-dimensional code. When the two-dimensional code is displayed in the image capturing area 402 and reading succeeds, capturing by the camera 304 ends. A cancel button 404 when pressed interrupts two-dimensional code reading and returns to a previous screen.

Figure 5:
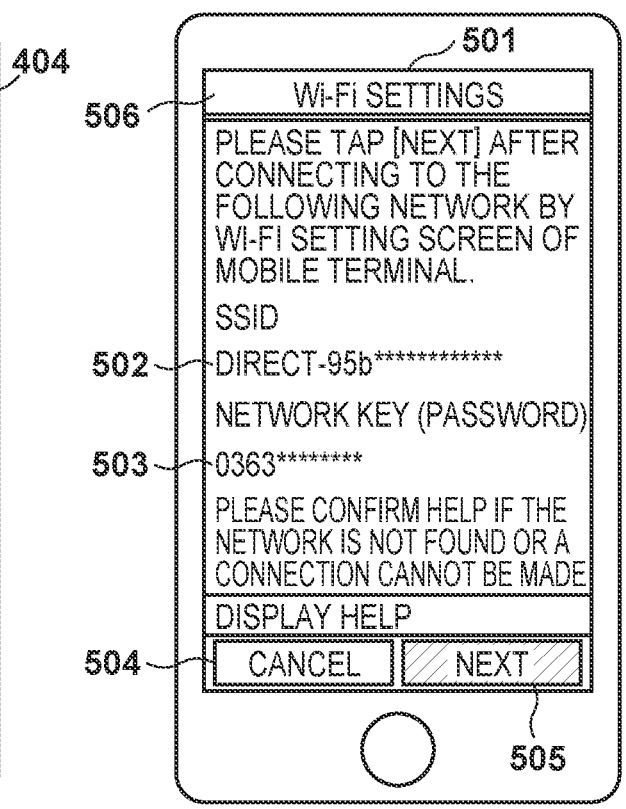
FIG. 5 is a network information display screen of the mobile terminal according to an embodiment.

FIG. 5 is a Wi-Fi setting screen 501 for analyzing information read from the two-dimensional code, and displaying network information. A screen title 506 displays a title ("Wi-Fi settings") indicating that this is a Wi-Fi setting screen. An SSID display label 502 displays an SSID read from the two-dimensional code. A network key display label 503 displays a network key (a password) read from the two-dimensional code. A cancel button 504 when pressed interrupts a networking switching flow, and returns to a home screen. A next button 505 is grayed out and cannot be pressed until network communication is started, and becomes pressable when the start of network communication is detected. When the next button 505 is pressed the following screen is advanced to.

Figure 6:
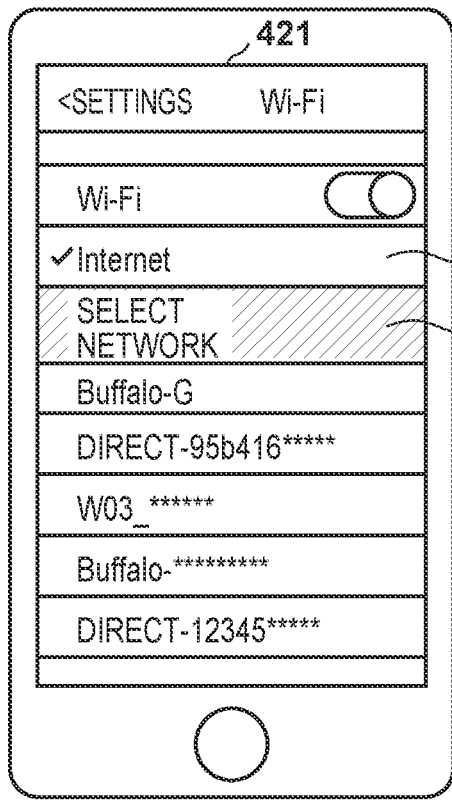
FIG. 6 is a setting screen for an OS of the mobile terminal according to an embodiment.

FIG. 6 is a network setting screen 421 for switching networks, and is a setting screen of the OS. A network display cell 422 displays the SSID of a Wi-Fi network with which there is communication currently. A network candidate list 423 displays a list of Wi-Fi SSIDs with which communication is possible. When one candidate is selected from the network candidate list 423, Wi-Fi communication is started, and a network to which communication has been made previously is displayed in the network display cell 422. In a case of a network to which there is communication for the first time, a password is requested, and when the correct password is inputted Wi-Fi communication is established and a display is made in the network display cell 422.

Figure 7:
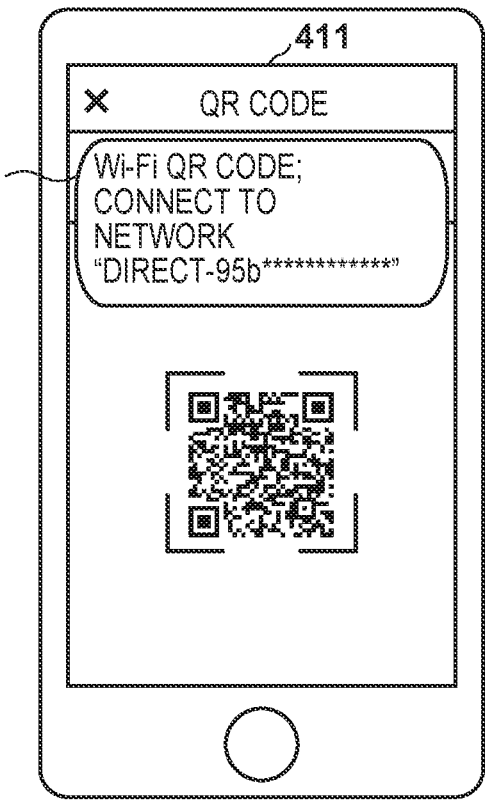
FIG. 7 is a two-dimensional code recognition pop-up screen of the mobile terminal according to an embodiment.

FIG. 7 is a two-dimensional code recognition pop-up screen 411. A pop-up dialog box 412 is displayed in accordance with recognition of a two-dimensional code when capturing the two-dimensional code displayed in the operation panel (an operation unit) 209 of the MFP 102 using the camera 304. When the pop-up dialog box is pressed, it becomes possible to select whether to make a connection or cancel, and when connecting is selected a Wi-Fi connection is started, and when cancel is selected an original screen is returned to.

Note that, as a method for acquiring network information of a connection destination, description was given regarding a method for acquiring network information of the connection destination from a two-dimensional code displayed on an operation unit of the connection destination device, but there is no intention for the present invention to be limited to this. For example, the network information may be acquired in accordance with short-range wireless communication when the mobile terminal 101 has been brought close to the MFP 102. In addition, the network information may be acquired in accordance with user input.

<Processing Procedure>

Figure 8:
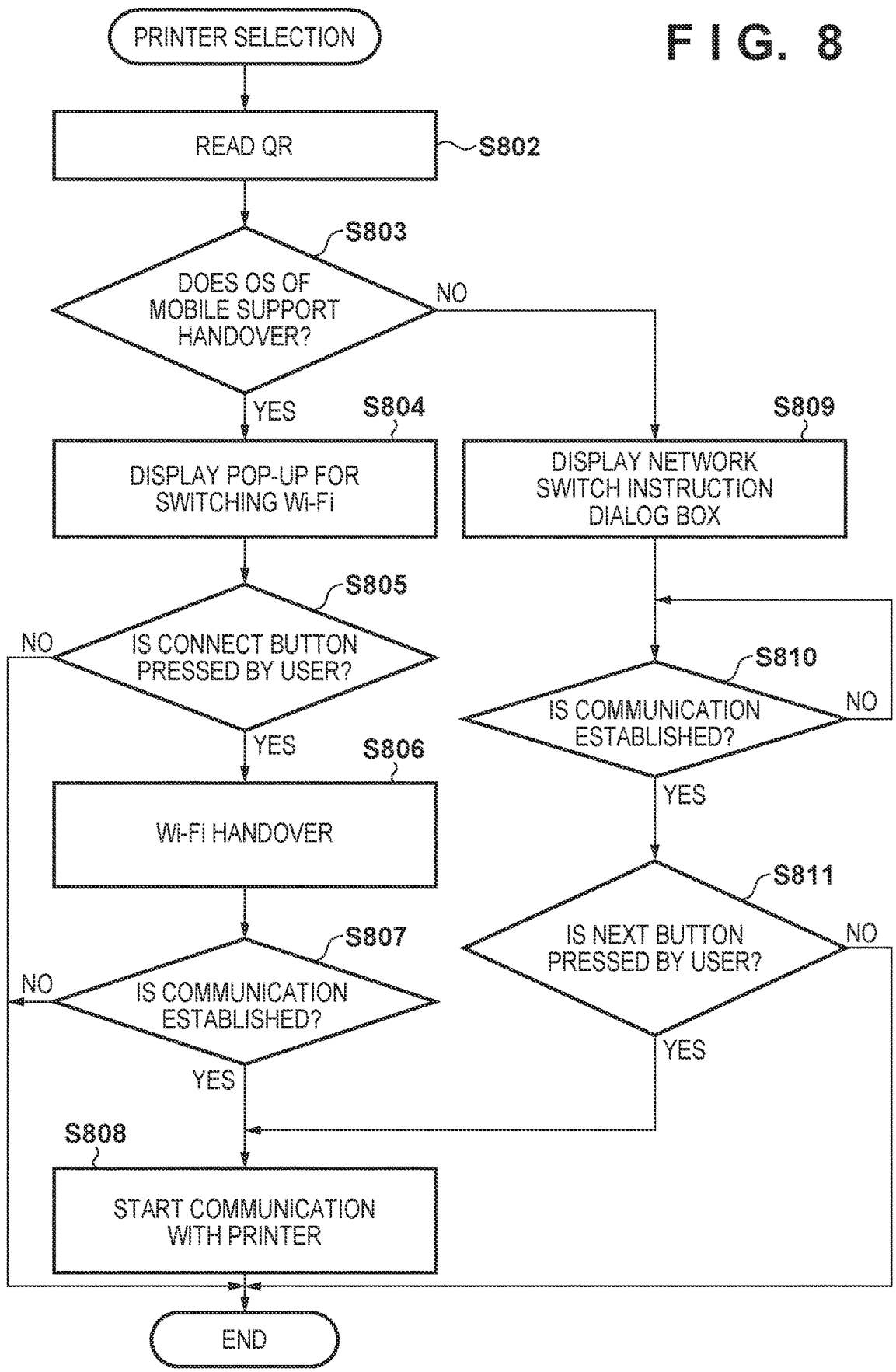
FIG. 8 is a flowchart for two-dimensional code reading by the mobile terminal according to an embodiment.

Next, with reference to FIG. 8, description is given regarding a processing procedure for when the two-dimensional code according to the present embodiment is used to search for the MFP 102 and establish communication. The processing described below is realized by, for example, the CPU 306 of the mobile terminal 101 reading a control program stored in advance in the ROM 307 or the HDD 309 into the RAM 308, and executing the control program.

Firstly, in step S802, the CPU 306 reads a two-dimensional code displayed on the operation panel 209 of the MFP 102 by the camera 304. In step S803, the CPU 306 discriminates an OS version of the mobile terminal 101. Here, if the OS version of the mobile terminal 101 is a version that supports a handover, the processing proceeds to step S804, and otherwise the processing proceeds to step S809.

In step S804, the CPU 306 displays the two-dimensional code recognition pop-up screen (selection screen) 411 on the operation panel 301. When a user presses the pop-up dialog box 412, in step S805, the CPU 306 displays options for connecting or cancelling. Furthermore, based on a user input with respect to the options, the CPU 306 selects whether to cancel or make a wireless connection in accordance with the two-dimensional code read by the camera 304. In a case where connecting is selected in step S805, the processing proceeds to step S806, and the CPU 306 executes a Wi-Fi handover based on network information (communication information) acquired from the two-dimensional code. Next, in step S807, the CPU 306 discriminates whether establishment of Wi-Fi communication succeeded, and when it succeeded, in step S808 communication with the MFP 102 starts, and the processing ends. If Wi-Fi communication leads to an error in step S807, the processing ends in the present state. In addition, if cancellation of a connection is selected in step S805, the processing ends in the present state.

Meanwhile, if the OS version of the mobile terminal 101 is a version that does not support a handover in step S803, the processing proceeds to step S809, and the CPU 306 displays the Wi-Fi setting screen 501 on the operation panel 301. Next, in step S810, the CPU 306 waits for the establishment of Wi-Fi communication, and when communication is established, controls to enable pressing of the next button 505 of the Wi-Fi setting screen 501. Subsequently, in step S811, the CPU 306 determines whether a user has pressed the next button 505, and when it is pressed the processing proceeds to step S808, and communication with the MFP 102 starts. Meanwhile, if it is determined in step S811 that a user pressed the cancel button, the processing ends in the present state.

<Detailed Processing of Step S809>

Figure 9:
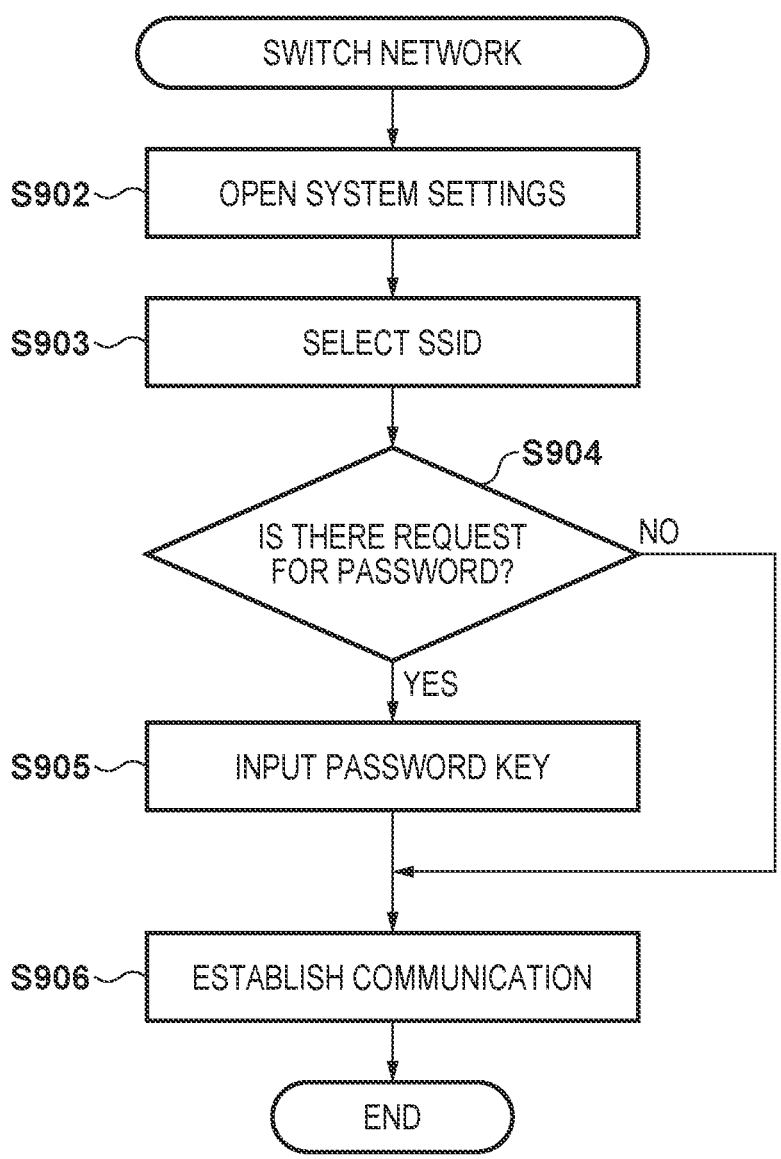
FIG. 9 is a flowchart for a user to switch Wi-Fi by a mobile terminal, according to an embodiment.

Here, with reference to FIG. 9, description is given for detailed processing of step S809 described above. While the Wi-Fi setting screen 501 is being displayed on the operation panel 301 in step S809 described above, a user needs to switch a Wi-Fi connection of the system. A flow for this processing is described. The processing described below is realized by, for example, the CPU 306 of the mobile terminal 101 reading a control program stored in advance in the ROM 307 or the HDD 309 into the RAM 308, and executing the control program.

In step S902, in accordance with user input, the CPU 306 displays a setting screen 421 for the system on the operation panel 301. Next, in step S903, the CPU 306 selects an SSID to connect to from the network candidate list 423 in accordance with user input. A user presses a desired network from the displayed list, which is an SSID corresponding to the two-dimensional code read in step S802. In step S904, the CPU 306 determines whether there is a request for a password for the selected SSID. When there is a request for a password, the processing advances to step S905, and the CPU 306 acquires the password in accordance with key input by a user, displays the acquired password on the network display cell 422, and then the processing advances to step S906. In contrast, when it is determined in step S904 that there is no request for a password, the processing advances to step S906 in the present state. In step S906, the CPU 306 establishes communication with a corresponding counterparty, and the processing ends.

As described above, a communication apparatus according to the present embodiment acquires network information of a connection destination to which to switch wireless communication, and uses the acquired network information to determine whether it is possible to automatically execute a handover. Furthermore, in a case where it is possible to automatically execute a handover, this communication apparatus executes the handover, and when a handover cannot be executed automatically, the communication apparatus performs screen control for supporting user input, and executes a handover in accordance with the user input. In addition, the present communication apparatus is provided with a camera, and acquires network information by reading a two-dimensional code displayed on an operation unit of an MFP. Furthermore, the communication apparatus determines whether it is possible to automatically execute a handover based on the version of the OS of the communication apparatus. Consequently, by virtue of the present embodiment, if operation of a mobile terminal changes in accordance with the OS version of the mobile terminal, it is possible to provide a method of switching to an optimal network in accordance with an OS version, when using a two-dimensional code to search for an MFP and establish communication. In more detail, the present communication apparatus can provided a user-friendly operation system for performing display control to suitably support a user, in accordance with an OS version.

Second Embodiment

Below, description will be given for a second embodiment of the present invention. In the first embodiment described above, description was given for control (user support control) for switching to an optimal network in accordance with the OS version of the mobile terminal 101 when searching for the MFP 102 and establishing communication, based on network information acquired from a two-dimensional code. However, when switching networks, it is possible to use copy and paste to simply input a password for a network, instead of by key input. Description is given in the present embodiment regarding such a method.

Figure 10:
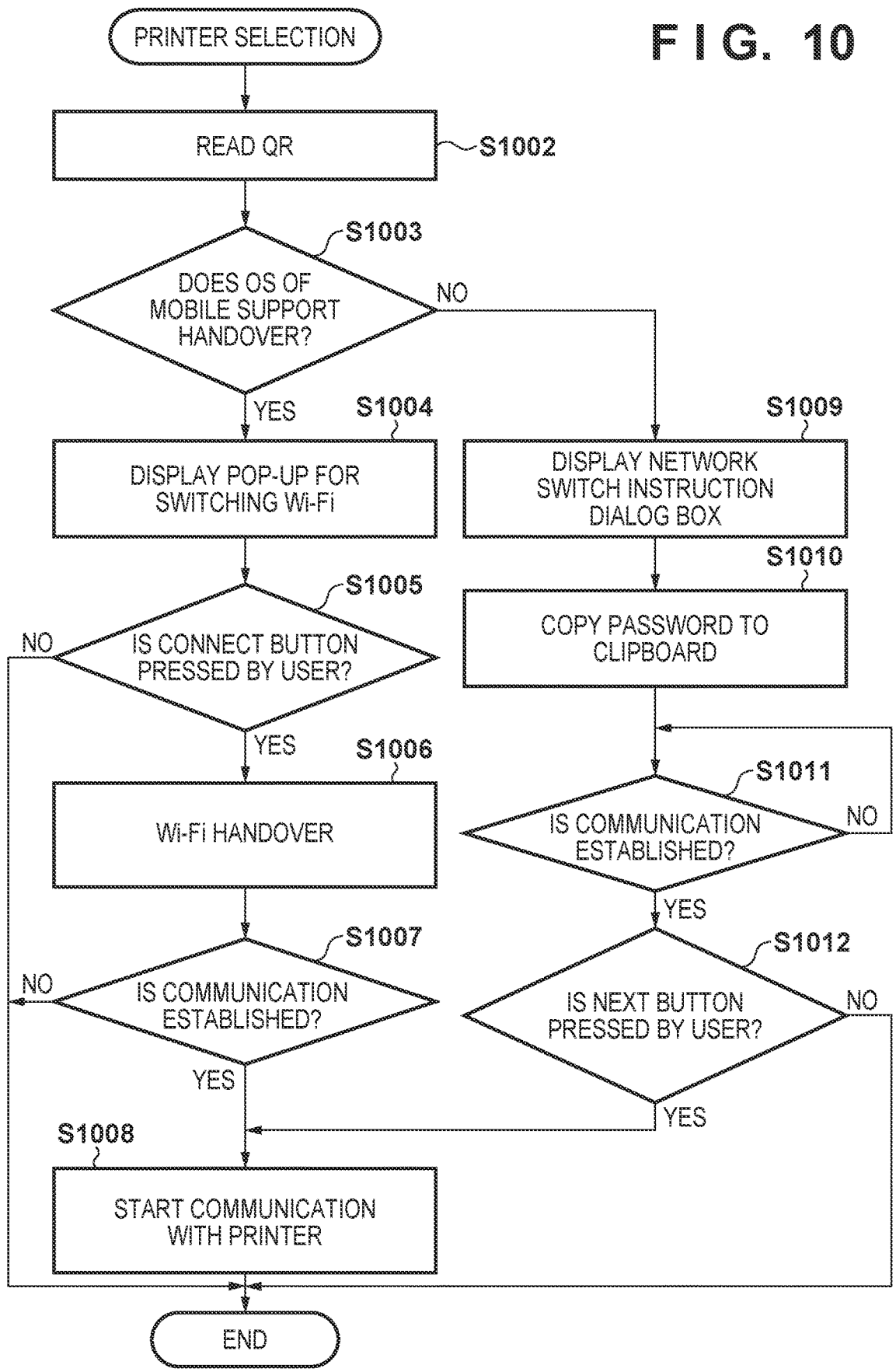
FIG. 10 is a flowchart for a two-dimensional code reading by the mobile terminal according to an embodiment.

With reference to FIG. 10, description is given regarding the processing procedure for establishing communication according to the present embodiment. The processing described below is realized by, for example, the CPU 306 of the mobile terminal 101 reading a control program stored in advance in the ROM 307 or the HDD 309 into the RAM 308, and executing the control program.

Firstly, in step S1002, the CPU 306 reads a two-dimensional code displayed on the operation panel 209 of the MFP 102 by the camera 304 of the mobile terminal 101. In step S1003, the CPU 306 discriminates an OS version of the mobile terminal 101. Here, if the OS version of the mobile terminal 101 is a version that supports a handover, the processing proceeds to step S1004, and otherwise the processing proceeds to step S1009.

In step S1004, the CPU 306 display the two-dimensional code recognition pop-up screen 411 on the operation panel 301. When a user presses the pop-up dialog box 412, in step S1005, the CPU 306 displays options for connecting or cancelling. Furthermore, based on a user input with respect to the options, the CPU 306 selects whether to cancel or make a wireless connection in accordance with the two-dimensional code read by the camera 304. In a case where connecting is selected in step S1005, the processing proceeds to step S1006, and the CPU 306 executes a Wi-Fi handover based on network information (communication information) acquired from the two-dimensional code. Next, in step S1007, the CPU 306 discriminates whether establishment of Wi-Fi communication succeeded, and when it succeeded, in step S1008 communication with the MFP 102 starts, and the processing ends. If Wi-Fi communication leads to an error in step S1007, the processing ends in the present state. In addition, if cancellation of a connection is selected in step S1005, the processing ends in the present state.

Meanwhile, if the OS version of the mobile terminal 101 is a version that does not support a handover in step S1003, the processing proceeds to step S1009, and the CPU 306 displays the Wi-Fi setting screen 501 on the operation panel 301. Next, in step S1010, the CPU 306 copies a network password displayed on the Wi-Fi setting screen 501 to a clipboard which is a temporary storage area. In step S1011, the CPU 306 waits for the establishment of Wi-Fi communication, and when communication is established, controls to enable pressing of the next button 505 of the Wi-Fi setting screen 501. Subsequently, in step S1012, the CPU 306 determines whether a user has pressed the next button 505, and when it is pressed the processing proceeds to step S1008, and communication with the MFP 102 starts. Meanwhile, if it is determined in step S1012 that a user pressed the cancel button, the processing ends in the present state.

<Detailed Processing of Step S1009>

Here, with reference to FIG. 11, description is given for detailed processing of step S1009 described above. While the Wi-Fi setting screen 501 is being displayed on the operation panel 301 in step S1009 described above, a user needs to switch a Wi-Fi connection of the system. A flow for this processing is described. The processing described below is realized by, for example, the CPU 306 of the mobile terminal 101 reading a control program stored in advance in the ROM 307 or the HDD 309 into the RAM 308, and executing the control program.

In step S1102, in accordance with user input, the CPU 306 displays the setting screen 421 for the system on the operation panel 301. Next, in step S1103, the CPU 306 selects an SSID to connect to from the network candidate list 423 in accordance with user input. A user presses a desired network from the displayed list, which is an SSID corresponding to the two-dimensional code read in step S1002. In step S1104, the CPU 306 determines whether there is a request for a password for the selected SSID. When there is a request for the password, the processing advances to step S1105, and the CPU 306 pastes the password which is saved in the clipboard, and displays the network display cell 422, and the processing proceeds to step S1106. In contrast, when it is determined in step S1104 that there is no request for a password, the processing advances to step S1106 in the present state. In step S1106, the CPU 306 establish communication with a corresponding counterparty, and the processing ends.

As described above, the communication apparatus according to the present embodiment omits user input for a password from among acquired network information, and controls to use acquired information. Consequently, by virtue of the present embodiment, when searching for an MFP that uses a two-dimensional code to establish communication, it is possible to simplify password input when a user switches a network by system settings, and it is possible to improve operability for a user to switch networks.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-226034 filed on Nov. 24, 2017, which is hereby incorporated by reference herein in its entirety.

What is claimed is:

1. A communication apparatus, comprising:
a memory device that stores a set of instructions; and
at least one processor that executes the set of instructions to:
acquire network information for establishing a wireless connection with an external apparatus using a first wireless communication method, based on information captured by an image capturing unit;
acquire information related to the communication apparatus from an operating system running on the communication apparatus and determine whether or not to request the operating system to change a connection destination of the first wireless communication method, based on the acquired information related to the communication apparatus;
in a case where it is determined to request the operating system to change the connection destination, control to transmit, to the operating system, a change request for changing, to a connection destination identified based on the acquired network information, the connection destination to which the communication apparatus performs a wireless connection using the first wireless communication method, and
in a case where it is determined not to request the operating system to change the connection destination, control to display a screen for prompting a user to switch a connection destination with a manual selection and via a setting screen provided by the operating system.

2. A method of controlling a communication apparatus, the method comprising:
acquiring network information for establishing a wireless connection with an external apparatus using a first wireless communication method based on information captured by an image capturing unit;
acquiring information related to the communication apparatus from an operating system of the communication apparatus and determining whether or not an application requests the operating system to change a connection destination of the first wireless communication method, based on the acquired information related to the communication apparatus;
in a case where it is determined that the application requests the operating system to change the connection destination, controlling, in the application, to transmit, to the operating system, a change request for changing, to a connection destination identified based on the acquired network information, the connection destination to which the communication apparatus performs a wireless connection using the first wireless communication method, and
in a case where it is determined that the application does not request the operating system to change the connection destination, controlling, in the application, to display a screen for prompting a user to switch a connection destination with a manual selection and via a setting screen provided by the operating system.

3. The method according to claim 2, wherein the network information is acquired from a two-dimensional code captured by the image capturing unit.

4. The method according to claim 3,
wherein the two-dimensional code is displayed on an operation unit of the external apparatus.

5. The method according to claim 2, further comprising:
displaying on a display device of the communication apparatus a selection screen for causing the user to select whether to perform a wireless connection to the connection destination, in a case where it is determined to request the operating system to change the connection destination, and
transmitting the change request to the operating system if making a wireless connection to the connection destination is selected by the user via the selection screen.

6. The method according to claim 2,
wherein the screen further includes information indicating the acquired network information and a message urging a user to switch a network setting by using the network information.

7. The method according to claim 5, wherein the first communication method is a Wi-Fi® communication method, and wherein the network information is a network key and an SSID indicating an access point which is provided by the external apparatus.

8. The method according to claim 7, further comprising in the application, copying the network key to a clipboard area provided by the operating system in a case where it is determined not to request the operating system to change the connection destination.

9. The method according to claim 2, wherein the obtained information about the communication device is a version of the operating system of the communication apparatus.

10. A non-transitory computer readable storage medium storing computer executable instructions for causing a computer to execute a method, the method comprising:

acquiring network information for establishing a wireless connection with an external apparatus using a first wireless communication method based on information captured by an image capturing unit;

acquiring information related to the communication apparatus from an operating system of the communication apparatus and determining whether or not an application requests the operating system to change a connection destination of the first wireless communication method, based on the acquired information related to the communication apparatus;

in a case where it is determined that the application requests the operating system to change the connection destination, controlling, in the application, to transmit, to the operating system, a change request for changing, to a connection destination identified based on the acquired network information, the connection destination to which the communication apparatus performs a wireless connection using the first wireless communication method, and in a case where it is determined that the application does not request the operating system to change the connection destination, controlling, in the application, to display a screen for prompting a user to switch a connection destination with a manual selection and via a setting screen provided by the operating system.

* * * * *